United States Patent [19]
Kennedy

[11] 3,817,555
[45] June 18, 1974

[54] VEHICULAR STEERING SYSTEM

[75] Inventor: Dennis L. Kennedy, Columbus, Ohio

[73] Assignee: Martec Corporation, Columbus, Ohio

[22] Filed: Oct. 13, 1971

[21] Appl. No.: 188,981

[52] U.S. Cl.................. 280/266, 280/282, 280/261
[51] Int. Cl............................................ B62k 9/02
[58] Field of Search ... 280/266, 263, 1.12, 87.04 A, 280/87.04 B, 259, DIG. 7, 211; D34/15 AL, 15 AJ, 15 AT

[56] References Cited
UNITED STATES PATENTS

| | | | |
|---|---|---|---|
| 576,746 | 2/1897 | Spangler | 280/261 |
| 827,012 | 6/1906 | Grove | 280/263 |
| 1,797,713 | 3/1931 | Brogelli | 280/DIG. 7 |
| 2,166,767 | 7/1939 | Petermann | 280/11.22 |
| 2,787,970 | 4/1957 | Bennett | 280/259 X |
| 2,812,031 | 11/1957 | Aghnides | 180/27 |
| 3,306,627 | 2/1967 | Goto | 280/259 |
| 3,327,796 | 6/1967 | Hanmer | 180/6.54 |
| 3,671,055 | 6/1972 | Aarup | 280/87.04 A |

*Primary Examiner*—Kenneth H. Betts

[57] ABSTRACT

This steering system concept is designed to provide positive directional control through a shifting of the center of mass of the rider (or load) with no necessary manipulation of a conventional steering control system (i.e. wheels, levers, etc.). The system is here illustrated on a children's vehicular toy, however it can be adapted to a variety of applications from theraputic devices to heavy equipment. A vehicle utilizing this system could be manually powered through pedals (as illustrated) or other manual devices or it could be powered by a variety of gasoline or electric motors with drive applied to any of the wheels.

4 Claims, 4 Drawing Figures

PATENTED JUN 18 1974　　　　　　　　　　　　　　　　3,817,555
FIG. 1
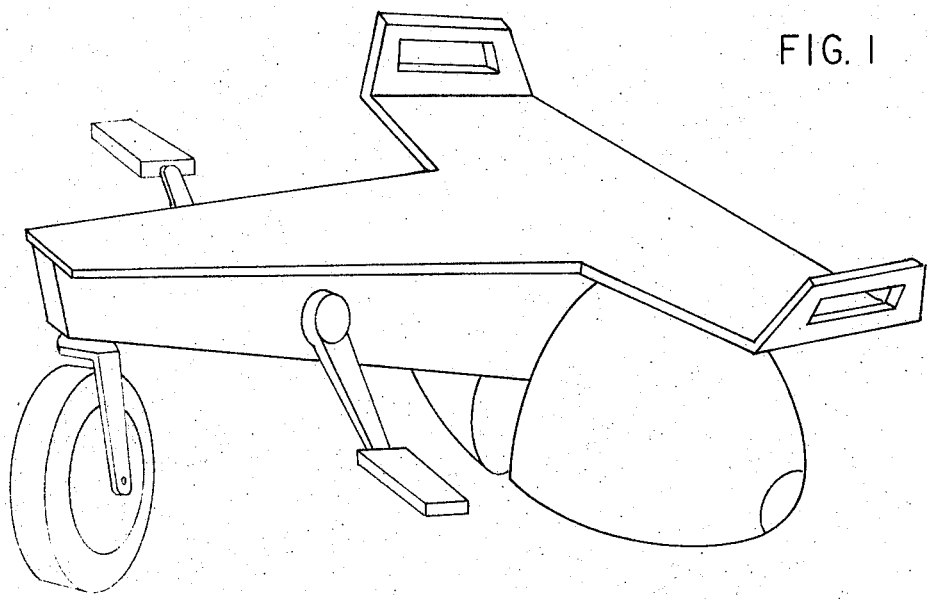
FIG. 2
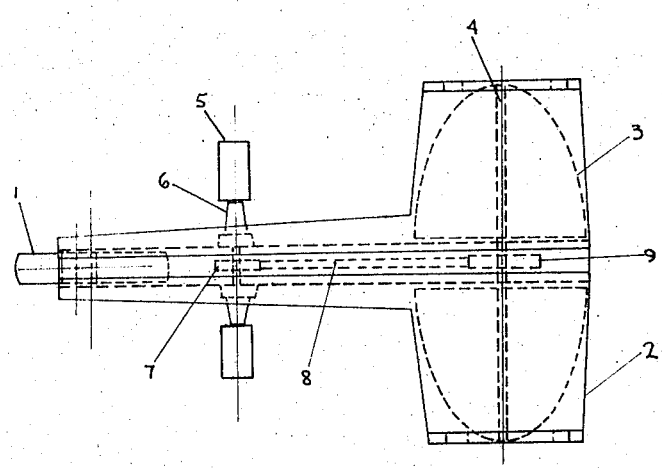
FIG. 4
FIG. 3
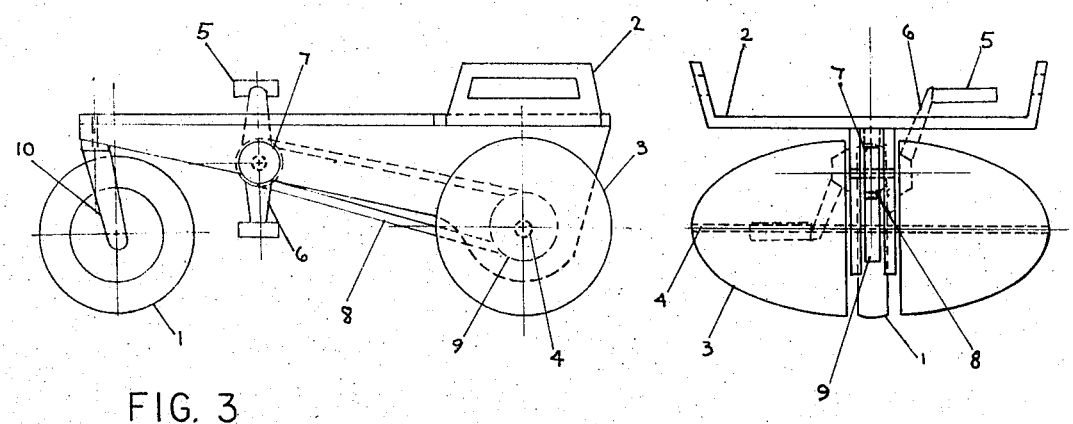
INVENTOR
Dennis L. Kennedy
BY

VEHICULAR STEERING SYSTEM

DESCRIPTION OF THE DRAWINGS

FIG. 1 is a view in perspective of the preferred embodiment of the invention.

FIG. 2 is a plan view of the embodiment of FIG. 1.

FIG. 3 is a view in side elevation of the embodiment of FIG. 1.

FIG. 4 is an end view of the embodiment of FIG. 1.

DESCRIPTION

Referring to the drawings; The steering system is composed of a framework of some description 2 upon which the rider (or load) rests. To this framework is attached a rear axle 4 and to that a pair of rear wheels 3. These rear wheels are actually one eliptical shape rigid-mounted to the rear axle and could be divided into any number of pieces to facilitate mounting to the frame and applying power. The rear wheel (s) are basically eliptical although the exact shape is variable, its shape will affect the steering characteristics and stability of the vehicle. This rear wheel or wheels is rotatably mounted to the frame so as to be rotatable about a generally horizontal axis. It has distally opposite tapering surfaces which are symetrical about the axis of rotation and taper outwardly from the center of the wheel and inwardly toward the axis of rotation. The front wheel 1 is a trailing-type caster mounted to the frame by means of a bracket 10 which is allowed to pivot on its vertical axis. The front wheel 1 is, more specifically, a caster type wheel carrier to which the wheel 1 is mounted. The carrier is formed so that the wheel 1 has a horizontal axis of rotation horizontally offset from a generally vertical pivot axis about which the carrier rotates. The illustrated configuration of the system is powered through foot pedals 5 attached to pedal arms 6 and to a shaft running through the frame to which is attached a pulley or sprocket 7. Power is transferred by means of a belt or chain to the rear pulley or sprocket 9 which is attached to the rear axle and powers the rear wheels.

The seat 2 could be formed in any shape which supports the body of the rider. It should extend laterally of the frame and over the oblong wheel a distance which is sufficient to permit a rider to steer the vehicle by tilting it in the manner described below.

In operation, a lateral shift in the center of mass of the rider (or load) causes the vehicle to rock laterally on the eliptical rear wheel. This tilting of the vehicle frame also tilts the vertical axis of the front caster-type wheel causing the front wheel to turn on its vertical axis to follow the path of least resistance and turning the entire vehicle in the direction that the rider (or load) shifted.

I claim:

1. A vehicle comprising:
   a. a vehicle frame;
   b. a generally oblong, non-spherical wheel means rotatably mounted to said frame and rotatable about its major axis which is generally horizontally aligned, said wheel means having distally opposite tapering surfaces, said surfaces being symmetrical about the axis of rotation and tapering outwardly away from the lateral center of said oblong wheel means and inwardly toward the axis of rotation of said wheel means;
   c. a caster type wheel carrier pivotally mounted to said frame near one end of the frame and longitudinally spaced from said oblong wheel means for pivotal movement around a generally vertical axis, said generally vertical axis being positioned on a longitudinal axis of said vehicle which is intermediate and generally perpendicular to the axis of rotation of said oblong wheel means;
   d. a wheel rotatably mounted to said wheel carrier for rotation around a generally horizontal axis which is horizontally offset from said generally vertical pivot axis; and
   e. seat means mounted to said frame for supporting a rider and positioned so that the center of gravity of the combination of said rider and said vehicle is above the axis of rotation of said wheel means, said seat means extending laterally of the frame a substantial distance which is sufficient to permit steering by tilting of said vehicle.

2. A vehicle according to claim 1 wherein said oblong wheel means comprises a pair of wheels, each having an outwardly tapered end.

3. A vehicle according to claim 1 wherein said wheel means is ellipsoidal.

4. A vehicle according to claim 1 wherein said oblong wheel means is the equivalent of a single wheel having ellipsoidal ends.

* * * * *